United States Patent [19]

Bennett et al.

[11] Patent Number: 5,715,456
[45] Date of Patent: Feb. 3, 1998

[54] METHOD AND APPARATUS FOR BOOTING A COMPUTER SYSTEM WITHOUT PRE-INSTALLING AN OPERATING SYSTEM

[75] Inventors: Craig Alan Bennett, Boca Raton; Salil Janardan Kulkarni, Boynton Beach, both of Fla.

[73] Assignee: International Business Machines Corporation, Armonk, N.Y.

[21] Appl. No.: 387,497

[22] Filed: Feb. 13, 1995

[51] Int. Cl.⁶ .................................................. G06F 9/06
[52] U.S. Cl. ............................................................ 395/652
[58] Field of Search ............................. 395/700, 652, 395/653, 651, 712

[56] References Cited

U.S. PATENT DOCUMENTS

| | | |
|---|---|---|
| 4,589,063 | 5/1986 | Shah et al. |
| 5,307,497 | 4/1994 | Feigenbaum et al. ............... 395/700 |
| 5,325,532 | 6/1994 | Crosswy et al. |
| 5,355,498 | 10/1994 | Provino et al. ......................... 395/700 |
| 5,418,918 | 5/1995 | Vander Kamp et al. ............... 395/700 |
| 5,448,741 | 9/1995 | Oka ........................................ 395/652 |
| 5,469,573 | 11/1995 | McGill, III et al. .................... 395/700 |
| 5,542,082 | 7/1996 | Solhjell ................................... 395/442 |
| 5,557,799 | 9/1996 | Welman ................................... 395/652 |

Primary Examiner—Kevin A. Kriess
Attorney, Agent, or Firm—Mark S. Walker; Andrew J. Dillon

[57] ABSTRACT

A method and apparatus are provided that significantly reduces the inconvenience of placing a computer system in a useful state. The invention quickly boots the system without preinstalling the operating system and allows installation of the operating system to occur without usurping the computer's resources from a user. A full version of the operating system is made accessible to the user by a boot device having sufficient capacity to hold the full operating system. A local media of the computer system is formatted so that the operating system may perform memory management functions, such as paging and swapping, if necessary. Consequently, the system is usable without requiring preinstallation of the operating system. The files relating to the operating system may be transferred from a boot device to a local media at a more convenient time, or performed as a concurrent or background process.

24 Claims, 4 Drawing Sheets

METHOD AND APPARATUS FOR BOOTING A COMPUTER SYSTEM WITHOUT PRE-INSTALLING AN OPERATING SYSTEM

FIELD OF THE INVENTION

This invention relates to a method of and apparatus for booting a computer system and, more particularly, for booting a computer system without preinstalling an operating system.

BACKGROUND OF THE INVENTION

Figure 1:
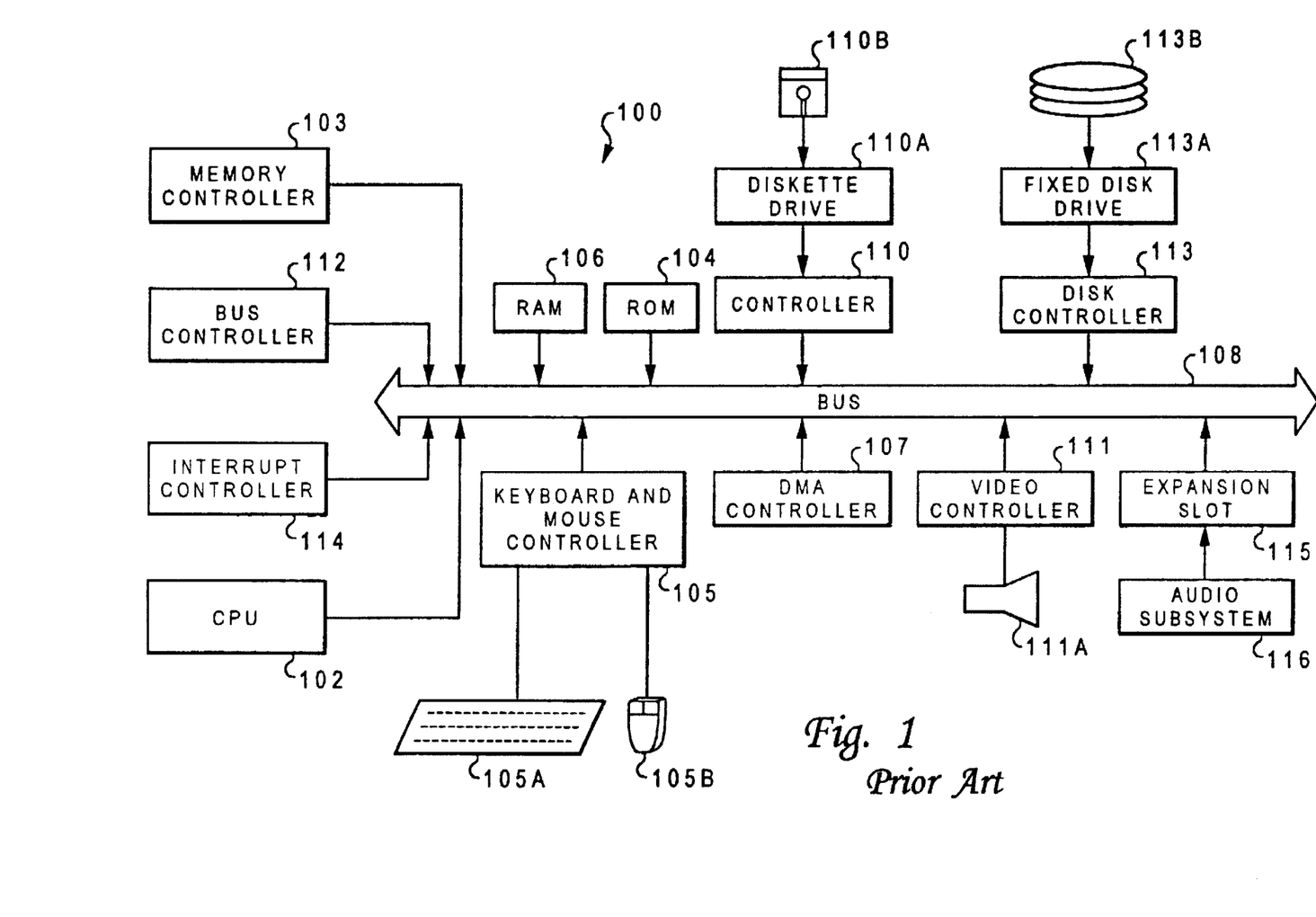
FIG. 1 illustrates a conventional computer architecture.

FIG. 1 illustrates the system architecture for a conventional computer system, such as an IBM PS/2® personal computer ("PC"). The exemplary computer system of FIG. 1 is for descriptive purposes only. Though the description below may refer to terms commonly used in describing particular computer systems and so,ware, such as an IBM PS/2® PC and the OS/2® operating system, available from the International Business Machines Corporation ("IBM"), Boca Raton, Fla., the concepts equally apply to other systems and software, including those having dissimilar architectures.

The exemplary computer 100 includes a central processing unit ("CPU") 102, which may include a conventional microprocessor; a random access memory ("RAM") 106 for temporary storage of information; a read only memory ("ROM") 104 for permanent storage of information; a diskette controller 110 for controlling a diskette 110B that may be inserted into diskette drive 110A; a disk controller 113 for controlling a fixed disk 113B that is local to the computer 100 and inserted in local media drive 113A; a keyboard and mouse controller 105 for controlling a keyboard input device 105A and a mouse input device 105B; a DMA controller 107 for performing direct memory access to RAM 106; a video controller 111 for controlling a video output display 111A; a memory controller 103 for controlling RAM 106; a bus controller 112 for controlling bus 108; and an interrupt controller 114 for receiving and processing various interrupt signals. Other input and output devices, such as an audio subsystem 116, may be connected to the system through an expansion slot 115.

The computer 100 is generally controlled and coordinated by operating system software. For example, the OS/2 operating system is an exemplary operating system suitable for use with computer 100. Operating systems provide resource management throughout a computer system, including such tasks as process execution and scheduling, memory management, file system services, networking and I/0 services, and user interface presentation. User applications, such as editors and spreadsheets, directly or indirectly, rely on these and other capabilities of the operating system.

The procedure for forcing a computer system into a known usable state—one from which computer applications may be executed—is generally called "booting." The general term "booting," however, may be further distinguished into "first boots," "cold boots," and "warm boots." Each type depends upon the state of the system when the booting operation is performed.

A "first boot" is performed when a computer system is powered on for the very first time. At such time, the computer system has a "minimal" known state. For example, the software installed on the computer system prior to first boot does not generally include a copy of a complete operating system.

If the system is already loaded with an operating system, a "cold boot" is performed when power is turned on. A cold boot requires fewer operations than a first boot, because the computer system has more known state prior to the boot operation. Among other things, the computer system already has a copy of the operating system installed in its associated local media, such as a non-volatile disk.

If the operating system is already loaded and the system is already powered on, a user may cause a "warm boot" to occur to force the system into a particular start state. Typically, this is caused by a predefined sequence of key strokes. A warm boot needs even fewer steps than a cold boot.

Conventional computer systems provide a variety of hardware and software mechanisms to boot the computer system to a useful state. The description below describes these mechanisms in the context of a first boot. Afterwards, a cold and warm boot are distinguished from the first boot.

Many components of a computer system are "volatile," which, by definition, means that the component has an unknown state when power is initially provided to the component. Some components, such as ROM memory and fixed disks, are non-volatile, which means that the component may have a known state upon the application of power. As such, non-volatile components may be preloaded with information, and upon the application of power, these components will power up having a known state so that the information is accessible.

When power is applied to a computer system, a portion of the computer system typically called the "initialization hardware" electronically detects the "power-on" condition and, in response to such a detection, forces certain circuitry of the system to a known state. For example, the CPU 102 typically includes an instruction pointer ("IP"), which holds a memory address from which the CPU 102 fetches an instruction to be executed by the CPU 102. The initialization hardware typically electronically forces the IP to an initial address so that the CPU 102 may begin fetching and executing instructions from this initial address. The ROM 104 is constructed to respond to memory transactions on bus 108 within a range of memory addresses that includes the initial address. Typically, the ROM 104 is prerecorded with computer instructions, referred to below as the "ROM-based code." Consequently, shortly after power on, the CPU begins executing the ROM-based code 104.

The ROM-based code 104 attempts to establish communication with a so-called "boot device." A boot device holds information that is necessary to boot the system. In attempting to establish communication with a boot device, the ROM-based code 104 operates according to a so-called "boot order." The boot order designates potential boot devices, such as a diskette 110B and a local media. Currently, fixed disks are typically used as local media 113B. However, as further described below, local media may employ other existing and future technologies. Typically, the first device listed in the boot order is a diskette 110B. As such, the ROM-based code 104 attempts to communicate with a diskette 110B to determine if it is the boot device. More particularly, the ROM-based code 104 attempts to retrieve a so-called "master boot record," described below, from a particular sector of the diskette 110B. If the communication attempt is successful, the ROM-based code 104 uses that device as the boot device. If not, the ROM-based code proceeds to attempt communication with the next device of the boot order, e.g., local media 113B.

In the case of a "first boot," the boot device is typically a diskette 110B inserted into the system. More particularly, a plurality of diskettes are often needed to store all of the information needed to boot the system, with each diskette inserted at an appropriate point in a sequence. The plurality of diskettes thus forms the boot device.

Assuming that the correct first diskette is inserted into the system, the ROM-based code 104 retrieves the master boot record from sector 0 of the first diskette 110B. The master boot record, among other things, typically includes information about the particular boot media, such as partitioning information for that diskette, and includes a pointer and an offset to a so-called operating system loader ("OS loader"). The ROM-based code 104 then copies the OS loader into RAM 106 from the first diskette, starting at the address indicated in the master boot record and continuing for a length indicated by the offset provided by the master boot record. After copying the OS loader into RAM 106, the ROM-based code 104 jumps to the OS loader.

The OS loader is more sophisticated than the ROM-based code 104 and performs certain preliminary functions, such as sizing memory. After performing preliminary functions, the OS loader copies into RAM 106 a portion of the operating system known as the "kernel."

The kernel provides certain core functionality of the operating system, such as memory management. After the kernel is copied into RAM 106, the OS loader jumps to a section of the kernel called "SYS INIT."

SYS INIT performs other conventional preliminary functions, such as executing system diagnostics to ensure that the system 100 is operating properly. These preliminary functions indicate whether continuation of the boot is worthwhile. For example, if a critical hardware fault is detected, a successful boot is unlikely and, therefore, continuation of the process is not worthwhile.

After performing preliminary functions, SYS INIT reads from diskette 110B an ASCII file called CONFIG.SYS. CONFIG.SYS includes ASCII statements, describing, among other things, which devices may possibly be connected to the system. CONFIG.SYS also includes the name of the program that should be executed after SYS INIT completes. This version of CONFIG.SYS is generic to the operating system; it is not tailored to the peculiar needs of a specific machine.

As SYS INIT reads CONFIG.SYS, it loads device drivers into RAM 106 in accordance with the ASCII statements. After loading a device driver, SYS INIT invokes the device driver at an initialization entry point, which, among other things, causes the device driver to detect whether a corresponding component is connected to the computer system. This must be done because the generic version of CONFIG.SYS will likely include many ASCII statements for devices that are not connected in a particular system. For example, CONFIG.SYS may include a directive to load a device driver to communicate with a computer network. If the system is not connected to a computer network, the device driver initialization routine returns a status code indicating that the device driver was unable to communicate with a network. In response to such a status code, CONFIG.SYS unloads, that device driver from memory, because it is unneeded.

CONFIG.SYS also includes information, indicating where certain files are stored. This information is read by SYS INIT and used to program data structures used by the kernel to determine where executable files, data files, dynamic linked libraries, and the like should be accessed. For example, this information may indicate that a GUI application should be accessed from the local media 113B.

After loading and unloading the device drivers and otherwise processing the statements of the CONFIG.SYS file, SYS INIT loads the application pointed to by CONFIG.SYS and then jumps to it. Typically, the generic CONFIG.SYS points to an "INSTALL" application.

Generally, INSTALL is responsible for transferring to the local media 113B the many files relating to the operating system. These files may be directly or indirectly needed by an application, and as such, they must be made accessible to the applications before the system is considered to be in a useful state.

INSTALL initially determines whether the local media 113B is operative. Among other things, INSTALL checks whether the local media 113B was pre-formatted and configured so that reads and writes may be performed from and to the disk 113B. If the local media 113B was not pre-formatted and configured, INSTALL executes the necessary instructions to format and configure the local media 113B. These operations must be performed to the local media 113B so that files may be copied to the local media 113B and so that the operating system may use the disk 113B to perform memory management functions, such as paging and swapping.

INSTALL then copies a common set of files from the diskettes 110B to the local media 113B. This common set of files typically includes the kernel, the OS loader, the GUI, the file system, i.e., system programs that every application program needs. This copying may require several diskettes to supply the appropriate information, each diskette being inserted at the appropriate point in the sequence.

After copying the common files, INSTALL copies particular files from the diskettes 110B to the local media 113B, depending upon information provided by the user.

INSTALL then causes the various device drivers to query their respective ports to determine whether devices are connected to the system. If the drivers are unable to determine such connectivity, INSTALL may request information from the user. Once this information is gathered, INSTALL creates a new, system specific CONFIG.SYS (as compared to the generic version discussed above.) and also creates other conventional, though system specific, configuration files, such as OS2.INI., which may be used for booting in the future. These system specific CONFIG.SYS files are helpful because they alleviate the need for future boots to load, then unload, device drivers, as described above when discussing the processing of the generic CONFIG.SYS.

INSTALL then copies the system specific files and jumps to a "next" program, such as the GUI. Conventional first booting and INSTALL are now complete.

The next time the system 100 is powered on, the system need only perform a cold boot, because the operating system is already stored on disk 113B. This assumes that a boot diskette is not inserted, which would cause the system to believe a first boot is intended. In contrast to the first boot, a cold boot results in the ROM-based code 104 not finding a diskette 110B as a boot device and instead proceeding through the boot order and finding the local media 113B as the boot device. The sequence of operations, discussed above—i.e., copying the OS loader, running SYS INIT to read and process CONFIG.SYS, etc.—are followed, but using the files from the local media 113B, including the system specific files. Moreover, the system specific CONFIG.SYS is created to point to the GUI or some other application, not INSTALL, because an INSTALL is unnecessary. A warm boot is similar to a cold boot, except that the initialization hardware does not need to force the various circuitry components into a known state.

Modern operating systems are large and complex. As stated above, OS/2 requires a plurality of installation media to store the entire operating system. Consequently, first booting and installing an operating system are time consuming. During this time, the user is unable to otherwise use the computer system, because the operating system is inaccessible to the user and the applications.

To alleviate this inconvenience, some manufacturers pre-record, or pre-install, the operating system on to the local media 113B. Consequently, the user need not first boot upon first using the system and instead merely cold boots. Pre-recording, however, increases the cost and complexity of manufacture. Besides requiring extra manufacturing steps, warehoused computer systems need to be subject to revision control mechanisms for the operating system software.

In addition, though the description above focused upon a first boot, those skilled in the art will appreciate that the same delays and inconvenience are present when a new version or revision of an operating system is released to subscribers. That is, in order to update a computer system to a new version of an operating system, the user must substantially follow the process of a first boot, including inserting numerous diskettes in a correct sequence to transfer the numerous files to local media 113B. Consequently, pre-recording an operating system on a disk is unhelpful in this context, because it is not possible.

Accordingly, there is a need in the art for a method and apparatus to boot a computer system without incurring the delay associated with installing the operating system.

In addition, there is a need in the art for a method and apparatus that allows the installation of a new version of an operating system to be performed conveniently without usurping use of the computer from the user.

SUMMARY OF THE INVENTION

This invention relates to a method and apparatus that significantly reduces the inconvenience of placing a computer system in a useful state. The invention involves a method of, and apparatus for, quickly booting the system without preinstalling the operating system and which allows installations to occur without usurping the computer's resources from a user. A full version of the operating system is made accessible to the user by a boot device. Consequently, the files relating to the operating system may be installed, or copied from the boot device, to a local media at a more convenient time, or the copying may be performed as a concurrent or background process. The local media of the computer system is formatted so memory management functions, such as paging and swapping, may be performed, if necessary.

The invention involves a method of and apparatus for booting a computer system, so that the CPU may execute applications under the control of an operating system, before the operating system is installed to the local media. Among other things, the invention includes a removable media having the operating system stored thereon. The operating system includes an operating system kernel, which controls the applications. A mechanism is provided for copying the kernel from the removable media into the memory. In addition, a mechanism is provided for initializing the kernel to recognize that bulk of the operating system files are located on the removable media. Consequently, the CPU may then execute applications on the system, under the control of the operating system supplied by the removable media, and the operating system may be transferred to the local media after applications have begun to be executed.

BRIEF DESCRIPTION OF THE DRAWING(S)

The above and further advantages of the invention may be better understood by referring to the following description in conjunction with the accompanying drawings in which.

DETAILED DESCRIPTION

Figure 2:
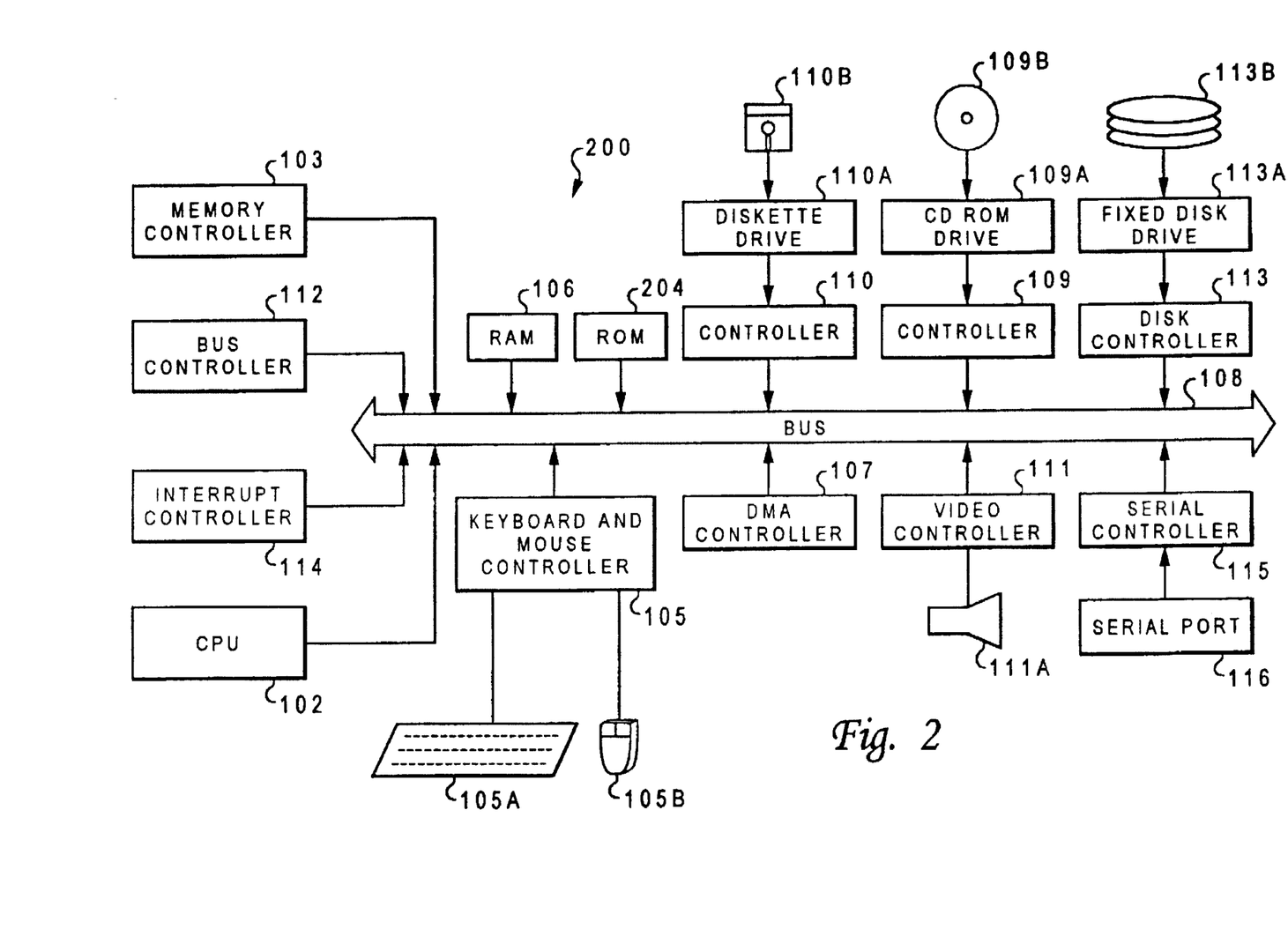
FIG. 2 illustrates a computer architecture according to an illustrative embodiment of the invention.

FIG. 2 illustrates a computer system 200 according to an illustrative embodiment of the invention. In many ways computer system 200 is similar to the conventional computer system of FIG. 1. Computer system 200, however, includes a compact disk ("CD") ROM controller 109 connected to CD ROM Drive 109A, in which a boot CD-ROM 109B is inserted. The structure and operation of CD-ROM controller 109 and drive 109A are understood by those skilled in the art and will not be described in further detail herein.

Boot CD-ROM 109B, however, is novel and configured and prerecorded with a complete image of the operating system. Current CD-Rooms can store approximately 640 MB of information, as compared to the approximately 1.4 MB capacity of conventional diskettes. Consequently, a single boot CD-ROM 109B may be used as a boot media, to store all of the information needed to perform a first boot and install. Boot CD-ROM 109B stores an essentially identical image to the conventional image that would be created on local media 113B as a result of the conventional INSTALL procedure, as discussed previously. One difference from the conventional image is that the boot CD-ROM 109B retains the operating system generic configuration files rather than the machine specific configuration files created by the conventional INSTALL. Other differences from the conventional image will be explained below. Moreover, though the description below refers to Boot CD-ROM 109B as a boot media, those skilled in the art will understand the invention may apply to other existing and future technologies.

Figure 3:
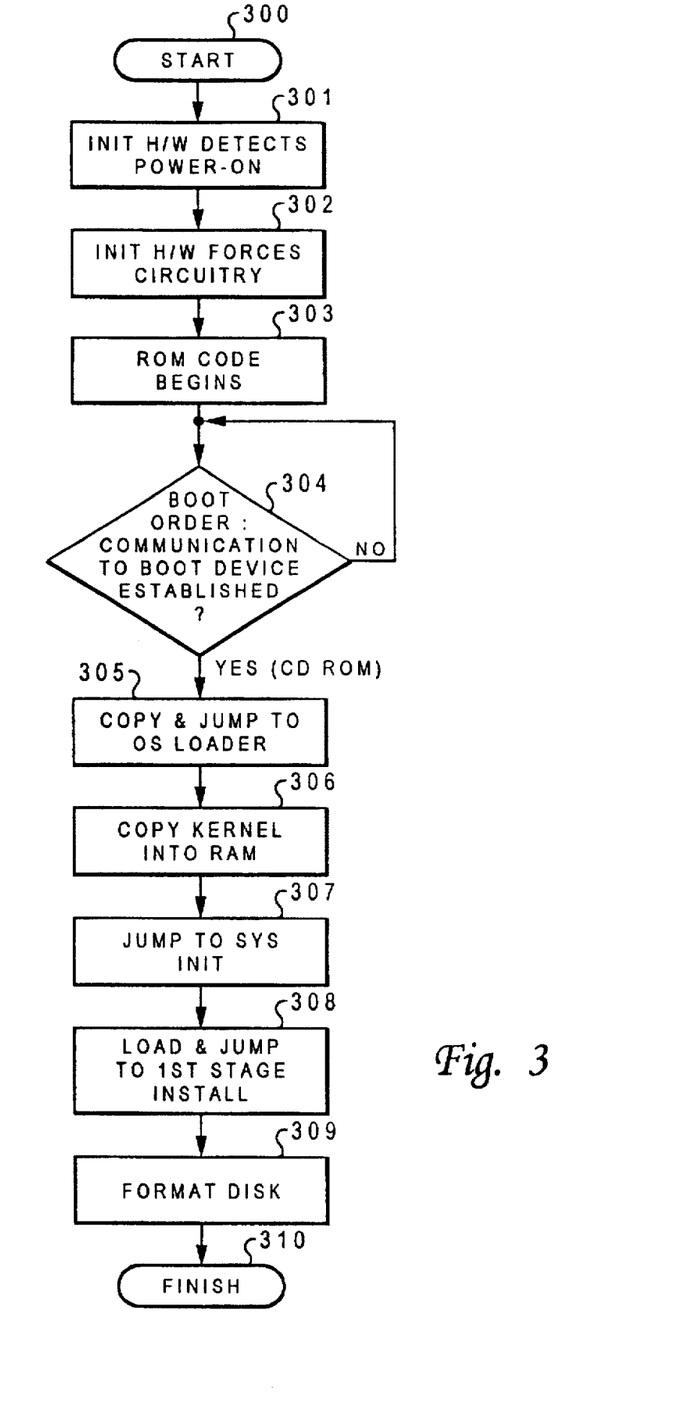
FIG. 3 is a flowchart, illustrating a method of quickly booting an operating system according to an illustrative embodiment of the invention.

FIG. 3 is a flowchart of the first boot process using boot CD-ROM 109B. The flow starts at step 300 and proceeds to step 301, in which the initialization hardware detects the power-on condition. In step 302, the initialization hardware forces certain critical circuitry to a known initial state, such as forcing the instruction pointer of the CPU 102 to an initial address that maps into the ROM-based code 204. In step 303, the CPU 102 begins execution of the ROM-based code 204. Steps 300-03 are the same as discussed above.

In step 304, the ROM-based code 204 attempts to communicate with a boot device according to a new boot order, which includes a boot CD-ROM 109B as a potential boot device. As such, the ROM-based code 204 attempts to communicate with the CD-ROM 109B to retrieve a master boot record, as discussed above. Assuming that the inventive method and apparatus are used, step 304 will successfully communicate with boot CD-ROM 109B.

In step 305, the CPU 102 executing the ROM-based code 204 copies the OS loader from boot CD-ROM 109B into RAM 106 using the master boot record stored on CD-ROM 109B, as discussed above. The CPU 102 then jumps from the ROM-based code 204 to the OS loader in RAM 106.

In step 306, the CPU 102 executing the code of the OS loader copies into RAM 106 the kernel stored on the boot CD-ROM 109B and jumps to SYS INIT. One embodiment of the invention partitions the kernel on the CD-ROM 109B in the same fashion as discussed above. The conventional OS loader may then be used to copy the kernel in stages as is done conventionally. Alternatively, the OS loader may be modified in conjunction with re-partitioning the kernel so that it may be copied in a single stage, for example.

In step 307, the CPU 102 executing the code of SYS INIT performs the preliminary functions and reads and processes CONFIG.SYS to initialize device drivers and the like, as discussed above. SYS INIT also initializes the data structures of the kernel, discussed above, to indicate where certain files should be retrieved from. For example, the data structures may be programmed to indicate that the CD-ROM 109B should be accessed for files having executable images and that local media 113B should be accessed for other operating system-related files, such as user-modifiable files that store a user's preferences for an application.

In step 308, the CPU 102 loads and jumps to the initial program pointed to by CONFIG.SYS. Unlike the conventional first boot, which would load and then jump to the INSTALL application discussed above, the inventive first boot loads and then jumps to a first stage, "quick" INSTALL application.

The first stage INSTALL application, in step 309, determines whether the local media 113B is formatted and configured using conventional techniques. If the disk 113B is not formatted and configured, the first stage INSTALL formats and configures the disk using techniques known in the art. As such, after step 309, disk 113B may be used to perform memory management functions, such as paging and swapping, and may have files written to it and read from it. The first stage install may copy certain files to the local media 113B so that these files may be written to by the user, such as the preference files discussed above. The data structures of the operating system relating to these files are programmed accordingly.

Step 310 indicates the completion of the inventive first stage boot. At this stage, the system is in a useful state, and a user may now utilize the system 200, for example, to invoke a GUI, editor, spreadsheet, or other executable image. The executable images reside on the CD-ROM 109B and are fully accessible for execution. Any writes performed to files relating to the executable image are directed to the related files which reside on local media 113B. Moreover, the operating system may perform memory management functions, because the disk 113B is formatted and configured by the first stage INSTALL. Under the conventional technique, at this point in time, the conventional system was unusable, because the operating system and other applications were inaccessible, residing primarily on uninserted diskettes.

At this stage in time, some limitations on the use of the system remain until the installation is fully completed in a second stage, discussed below. For example, the boot CD-ROM 109B must remain in drive 109 so that the operating system is accessible to applications, when needed. Consequently, applications that require CD-ROM data from a different CD ROM have to wait until the operating system is fully installed on the local media 113B, thus freeing the CD-ROM drive 109 for other uses. Alternatively, such applications may be invoked if another CD-ROM data source, such as a second controller 109, is provided.

Figure 4:
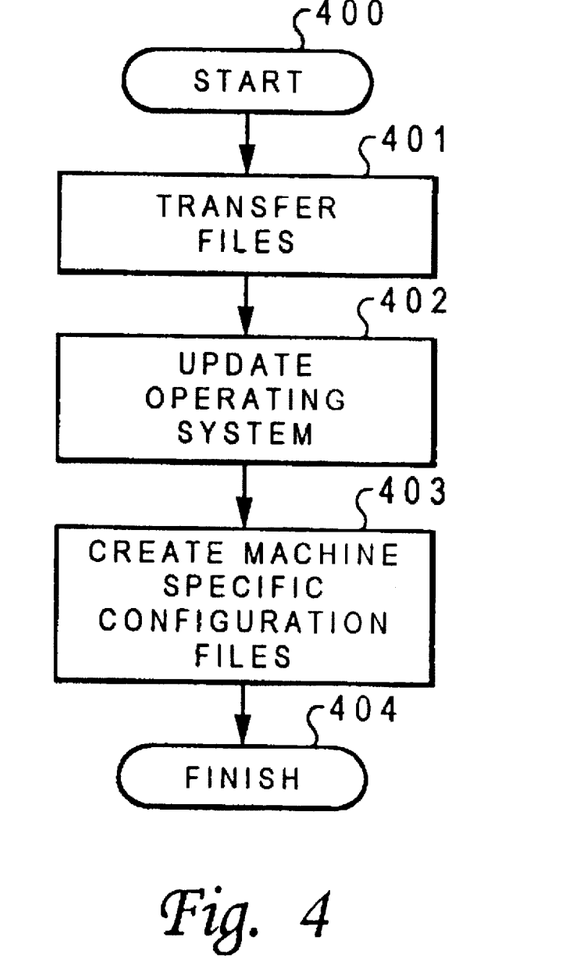
FIG. 4 is a flowchart, illustrating a method of performing a second stage of installing an operating system according to an illustrative embodiment of the invention.

FIG. 4 is a flowchart, illustrating a second stage INSTALL of the operating system to local media 113B. The second stage installation process begins at step 400 and may be invoked in any number of ways, including queuing the second stage INSTALL process to the operating system to execute as a background process; queuing the second stage INSTALL process to execute as a concurrent process; or queuing the second stage INSTALL process to execute at a later, more convenient time.

In step 401, the second stage INSTALL uses conventional techniques to transfer files from the boot CD ROM 109B to the local media 113B. In step 402, the second stage INSTALL updates the data structures of the operating system to indicate that requests for the transferred files should be directed to local media 113B. In step 403, the second stage INSTALL creates machine specific configuration files and loads them to local media 113B using conventional techniques. At step 404 the boot and installation of the system is complete. At this point any requests that were previously directed to the CD ROM 209B, such as a request for a GUI, are directed to local media 113B. The drive 209A may be used for other CD-ROMs.

Consequently, a computer system may be booted quickly without requiring preinstallation of the operating system. This is not only helpful for first boots, but also allows revisions of and new versions of operating systems to be incorporated into a computer system more conveniently. A user may insert the boot CD-ROM 109B, containing the new code, into the system and cause the system to re-boot. A first boot is performed, causing the system to enter a useful state including the new code. The new code may be transferred to the local media later, as discussed above. Alternatively, the user may continue to use the present version of the operating system and invoke the second stage install application in the background to transfer the files to local media 113B. Then after the second stage is complete, the user may cause the system to re-boot causing the system to perform a cold or warm boot using the new operating system residing on the disk 113B.

An illustrative embodiment, and certain variations, of the invention have been described. Other variations and modifications, however, may be made to this embodiment, which will attain some or all of the advantages of the invention. For example, in the detailed description the boot device is implemented with a CD-ROM 109B and the local media, to which operating system files are eventually transferred, is implemented with fixed disk 113B. It is contemplated, however, that any storage or memory technology, including, but not limited to, magnetic, optical, semiconductor or other present or future technologies, may be used to implement the components of the invention. It is, therefore, an object of the appended claims to cover all such variations and modifications that come within the true spirit and scope of the invention.

What is claimed is:

1. Apparatus for booting a computer system, having initial booting instructions, a local media, and a memory, so that the computer system may execute non-operating system application programs under the control of operating system programs before the operating system programs are installed on the local media, the apparatus comprising:

means for communicating with a removable boot media having stored thereon the operating system programs, which include a kernel portion;

means responsive to the initial booting instructions for copying the kernel portion from the removable boot media into the memory;

means responsive to the initial booting instructions, for initializing the kernel portion to recognize that the operating system programs are located on the removable boot media; and means responsive to the initial booting instructions for starting the kernel portion so that non-operating system application programs may then execute on the computer system, under the control of the kernel portion and operating system programs located on the removable boot media.

2. The apparatus of claim 1 further comprising means, controlled by the kernel portion, for determining whether the local media is formatted and means controlled by the kernel portion for formatting the local media if it is not formatted.

3. The apparatus of claim 1 wherein the kernel portion comprises:

means operable when the kernel portion is executing for determining a hardware configuration for the computer system and for building a configuration file based on the hardware configuration; and means controlled by the configuration file for loading an installation program from the removable boot media and for starting the installation program.

4. The apparatus of claim 3 further comprising:

means controlled by the installation program for loading a non-operating system application program and starting the non-operating system application program; and means controlled by the operating system programs located on the boot media for installing the operating system programs from the removable boot media to the local media, after the non-operating system application program has started.

5. The apparatus of claim 1 wherein the local media is fixed disk.

6. The apparatus of claim 1 wherein the removable boot media is a CD-ROM.

7. A method for booting a computer system having a boot ROM containing initial booting instructions, a local media, and a memory, so that the computer system may execute non-operating system application programs under the control of operating system programs before the operating system programs are installed on the local media, the method comprising the steps of:

A. receiving a removable boot media having stored thereon the operating system program, which include a kernel portion;

B. copying the kernel portion from the removable boot media into the memory under control of the initial booting instructions;

C. initializing the kernel portion to recognize that the operating system programs are located on the removable boot media under control of the initial booting instructions; and D. starting the kernel portion so that non-operating system application programs may then execute on the system, under the control of the kernel portion and operating system programs located on the removable boot media.

8. The method of claim 7 further comprising the steps of:

E. determining whether the local media is formatted; and

F. formatting the local media when the local media is not already formatted.

9. The method of claim 7 wherein step D comprises the steps of:

D1. determining a hardware configuration for the computer system;

D2. building a configuration file based on the hardware configuration;

D3. loading an installation program identified by the configuration file from the removable boot media; and D4. starting the installation program.

10. The method of claim 9 further comprising the steps of:

G. loading a non-operating system application program under control of the installation program;

H. starting the non-operating system application program; and

I. installing the operating system programs from the removable boot media to the local media, after the non-operating system application program has started.

11. Apparatus for booting a computer system, having a boot ROM containing initial booting instructions, a local media, and a memory, so that the computer system may execute non-operating system application programs with a modifiable user preference file under the control of operating system programs, before the operating system programs are installed to the local media, the apparatus comprising:

means for communicating with a removable boot media having stored thereon the operating system programs which include a kernel program for controlling the application with associated user preference files;

means responsive to the initial booting instructions for establishing a communication path between the removable boot media and the memory;

means responsive to the initial booting instructions for copying the kernel program from the removable boot media into the memory over the communication path;

means controlled by the kernel program for loading an installation file from the removable boot media to the memory and for starting the installation program;

means controlled by the installation program for copying the user preference files from the removable boot media to the local media; and means controlled by the installation program for initializing the kernel program to recognize that operating system programs are located on the removable boot media and that the user preference file is located on the local media so that non-operating system application programs may execute on the system, under the control of operating system programs on removable boot media.

12. The apparatus of claim 11 further comprising means controlled by the installation program for determining whether the local media is formatted and for formatting the local media if it is not already formatted.

13. The apparatus of claim 11 further comprising means for starting a non-operating system application program and means for installing operating system programs from the removable boot media to the local media, after the non-operating system application program has started.

14. The apparatus of claim 13 wherein the means for installing operating system programs is a background process under the control of the operating system programs located on the removable boot media.

15. The apparatus of claim 9 wherein the local media is a fixed disk.

16. The apparatus of claim 9 wherein the removable boot media is a CD-ROM.

17. A method for booting a computer system, having a boot ROM containing initial booting instructions, a local media, and a memory, so that the computer system may execute non-operating system application programs with a modifiable user preference file under the control of operating system programs, before the operating system programs are installed to the local media, the method comprising the steps of:

A. receiving a removable boot media having stored thereon the operating system programs which include a kernel program for controlling the application with associated user preference files;

B. establishing a communication path between the removable boot media and the memory under control of the initial booting instructions;

C. copying the kernel program from the removable boot media into the memory over the communication path;

D. loading an installation file from the removable boot media to the memory;

E. starting the installation program;

F. copying the user preference files from the removable boot media to the local media; and G. initialing the kernel program to recognize that operating system programs are located on the removable boot media and that the user preference file is located on the local media so that non-operating system programs may execute on the system, under the control of operating system programs on removable boot media.

18. The method of claim 17 further comprising the steps of:

H. determining whether the local media is formatted; and

I. formatting the local media if it is not already formatted.

19. The method of claim 17 further comprising the steps of:

J. starting a non-operating system application program; and

K. installing operating system programs from the removable boot media to the local media, after the non-operating system application program has started.

20. The method of claim 19 wherein step K operates as a background process under the control of the operating system programs on the removable boot media.

21. The method of claim 19 wherein step K includes:

K1. transferring the operating system programs from the boot media to the local media;

K2. modifying the kernel program to recognize that the operating system programs are located on the local media so that the non-operating system application program may execute on the computer system under the control of the operating system programs located on the local media; and K3. creating machine specific configuration files, which may be used during subsequent booting operations.

22. Apparatus for booting a computer system, having a CPU, a RAM, and a local media, so that the CPU may execute non-operating system application programs under the control of an operating system, before the operating system is installed to the local media, the non-operating system application programs having modifiable user preference files associated therewith, said apparatus comprising:

a removable boot CD-ROM having stored thereon an OS loader, the applications, with associated user preference files, and the operating system, which includes a kernel portion for controlling applications and having a SYS INIT portion;

a ROM having computer instructions stored thereon, that, when executed by the CPU, causes the CPU to establish communication with the boot CD-ROM and to copy the OS loader from the removable boot CD-ROM to the RAM, and which causes the CPU to jump to the OS loader, the OS loader having computer instructions which, when executed by the CPU, causes the CPU to copy the kernel from the removable boot CD-ROM into RAM and which causes the CPU to jump to the SYS INIT portion of the kernel, the SYS INIT portion having computer instructions which, when executed, causes the CPU to initialize the kernel to recognize that the operating system is supplied by the removable boot CD-ROM and that the user preference files reside on the local media, so that non-operating system application programs may execute on the system, under the control of the operating system supplied by the removable boot CD-ROM, and such that the non-operating system application programs may modify their associated user preference files stored on the local media, and such that the operating system may be transferred to the local media after applications have begun to be executed;

means for causing the CPU to execute the computer instructions stored on the ROM; and means for transferring the user preference files from the removable boot CD-ROM to the local media.

23. A computer program product for use in a computer system having a memory, a local media, a boot media having stored thereon operating system programs, which include a kernel portion, and an instruction media having stored thereon initial booting instructions for causing the computer system to copy the kernel portion from the boot media onto the memory, the computer program product comprising:

a computer usable medium having computer readable program code means embodied in said medium for causing the computer system to boot so that the computer system may execute non-operating system application programs under the control of the operating system programs before the operating system programs are installed on the local media, the computer program product comprising:

first program code means for causing the computer system to invoke the booting instructions and to initialize the kernel portion to recognize that the operating system programs are located on the boot media; and second program code means for causing the computer to start the kernel portion so that non-operating system application programs may then execute on the system under the control of the kernel portion and the operating system programs located on the boot media.

24. The computer program product of claim 23 further comprising:

third program code means for determining whether the local media is formatted; and fourth program code means for causing the computer to format the local media when the local media is not already formatted.

* * * * *